US011959594B2

(12) United States Patent
Kim et al.

(10) Patent No.: US 11,959,594 B2
(45) Date of Patent: Apr. 16, 2024

(54) END CAP HOLDER FOR A GAS CYLINDER

(71) Applicant: Samsung Electronics Co., Ltd., Suwon-si (KR)

(72) Inventors: Minyoung Kim, Hwaseong-si (KR); Kwangjun Kim, Ansan-si (KR); Kyeongsup Byeon, Suwon-si (KR); Byungjun An, Suwon-si (KR); Huigwan Lee, Hwaseong-si (KR); Byeongchan Jeong, Seoul (KR); Hyungho Choi, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 235 days.

(21) Appl. No.: 17/677,452

(22) Filed: Feb. 22, 2022

(65) Prior Publication Data

US 2023/0009496 A1 Jan. 12, 2023

(30) Foreign Application Priority Data

Jul. 8, 2021 (KR) ........................ 10-2021-0089550

(51) Int. Cl.
*F17C 13/00* (2006.01)
*F17C 13/04* (2006.01)
*F17C 13/06* (2006.01)

(52) U.S. Cl.
CPC .............. *F17C 13/06* (2013.01); *F17C 13/00* (2013.01); *F17C 13/04* (2013.01);
(Continued)

(58) Field of Classification Search
CPC ... F17C 13/04; F17C 16/06; F17C 2205/0308
See application file for complete search history.

(56) References Cited

U.S. PATENT DOCUMENTS 10,919,234 B2 2/2021 Canalini et al.
11,378,232 B2 * 7/2022 Kim ...................... F17C 13/084
(Continued)

FOREIGN PATENT DOCUMENTS

CN 110892190 A 3/2020
CN 112539342 A 3/2021
(Continued)

OTHER PUBLICATIONS

Korean Office Action dated Jan. 2, 2023 issued in corresponding Korean Appln. No. 10-2021-0089550.
(Continued)

*Primary Examiner* — Bradley Duckworth
(74) *Attorney, Agent, or Firm* — Harness, Dickey & Pierce, P.L.C.

(57) ABSTRACT

An end cap holder may include a base block and a holding block. The base block may be configured to provide an end cap, which may be at a nozzle of the gas cylinder, with a torque for combining/separating the end cap with/from the nozzle. An angle correction groove may be formed at a first surface of the base block oriented toward the end cap. The holding block may be rotatably receivable in the angle correction groove to hold the end cap. The holding block may selectively make point contact with the base block to transmit the torque of the base block to the end cap. Thus, the holding block may accurately hold the end cap tilted to a vertical axis or a horizontal axis.

10 Claims, 6 Drawing Sheets

(52) U.S. Cl.
CPC ................. *F17C 2205/0311* (2013.01); *F17C 2205/0323* (2013.01); *F17C 2209/22* (2013.01)

(56) References Cited

U.S. PATENT DOCUMENTS

| | | | | |
|---|---|---|---|---|
| 11,603,966 | B2 * | 3/2023 | Kim ........................ | F16K 21/04 |
| 2020/0216210 | A1 | 7/2020 | Corazza et al. | |
| 2022/0090740 | A1 | 3/2022 | Kim et al. | |

FOREIGN PATENT DOCUMENTS

| | | | |
|---|---|---|---|
| JP | 3599572 | B2 | 12/2004 |
| KR | 10-2019-0115983 | A | 10/2019 |
| KR | 102035697 | B1 | 10/2019 |
| KR | 102049326 | B1 | 11/2019 |
| KR | 102074249 | B1 | 2/2020 |
| KR | 102108762 | B1 | 5/2020 |
| KR | 102108763 | B1 | 5/2020 |
| KR | 102112766 | B1 | 5/2020 |
| KR | 102158015 | B1 | 9/2020 |

OTHER PUBLICATIONS

Taiwanese Office Action dated Jan. 7, 2023 issued in corresponding Taiwanese Appln. No. 111108110.

* cited by examiner

END CAP HOLDER FOR A GAS CYLINDER

CROSS-RELATED APPLICATION

This application claims priority under 35 USC § 119 to Korean Patent Application No. 10-2021-0089550, filed on Jul. 8, 2021 in the Korean Intellectual Property Office (KIPO), the contents of which are herein incorporated by reference in their entirety.

BACKGROUND

1. Field

Example embodiments relate to an end cap holder for a gas cylinder. More particularly, example embodiments relate to an end cap holder configured to combine/separate an end cap with/from a nozzle of a gas cylinder.

2. Description of the Related Art

Generally, various gases may be used for fabricating a semiconductor device. The gases may be stored in a gas cylinder. The gas cylinder may include a nozzle configured to inject the gas and a valve configured to open and close the nozzle. The nozzle may be sealed with an end cap. The end cap may be automatically combined/separated with/from the nozzle by a torque provided from an exchanger. The torque may be transmitted to the end cap through a holder configured to hold the end cap.

According to related arts, when the valve may be tilted to a vertical axis, the end cap may also be slanted to the vertical axis. Thus, the end cap holder may not accurately hold the end cap.

SUMMARY

Example embodiments provide an end cap holder for a gas cylinder that may be capable of accurately holding a tilted end cap.

According to example embodiments, there may be provided an end cap holder for a gas cylinder. The end cap holder may include a base block and a holding block. The base block may be configured to provide an end cap, which may be at a nozzle of the gas cylinder, with a torque for combining/separating the end cap with/from the nozzle. An angle correction groove may be at a first surface of the base block oriented toward the end cap. The holding block may be rotatably receivable in the angle correction groove to hold the end cap. The holding block may selectively make point contact with the base block to transmit the torque of the base block to the end cap.

According to example embodiments, the holding block may be rotatably receivable in the angle correction groove so that the holding block may accurately hold the end cap tilted to a vertical axis or a horizontal axis. Thus, a time for assembling/disassembling the end cap may be reduced.

BRIEF DESCRIPTION OF THE DRAWINGS

Example embodiments will be more clearly understood from the following detailed description taken in conjunction with the accompanying drawings.

FIG. 1 is an exploded perspective view illustrating a gas cylinder with an end cap holder in accordance with example embodiments;

FIG. 2 is a perspective view illustrating a gas cylinder with an end cap holder in accordance with example embodiments;

FIG. 3 is a perspective view illustrating an end cap held by the end cap holder in FIG. 2;

FIG. 4 is a side view illustrating the end cap holder in FIG. 2;

FIG. 5 is a cross-sectional view illustrating the end cap holder in FIG. 4;

FIG. 6 is a cross-sectional view taken along a line A-A' in FIG. 4;

FIG. 7 is a cross-sectional view illustrating an end cap held by the end cap holder in FIG. 6; and FIG. 8 is an enlarged cross-sectional view of a portion "B" in FIG. 7.

DETAILED DESCRIPTION OF EXAMPLE EMBODIMENTS

Hereinafter, example embodiments will be explained in detail with reference to the accompanying drawings.

Figure 1:
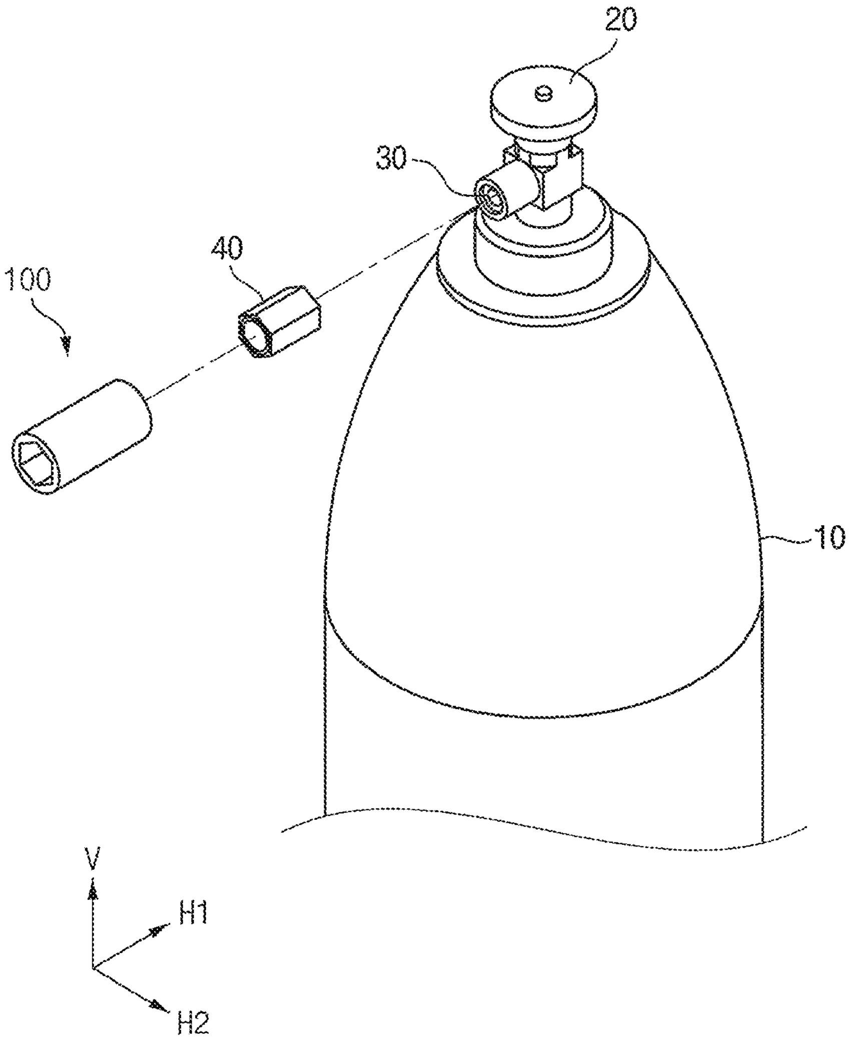
FIGS. 1 to 8 represent non-limiting, example embodiments as described herein.
Figure 2:
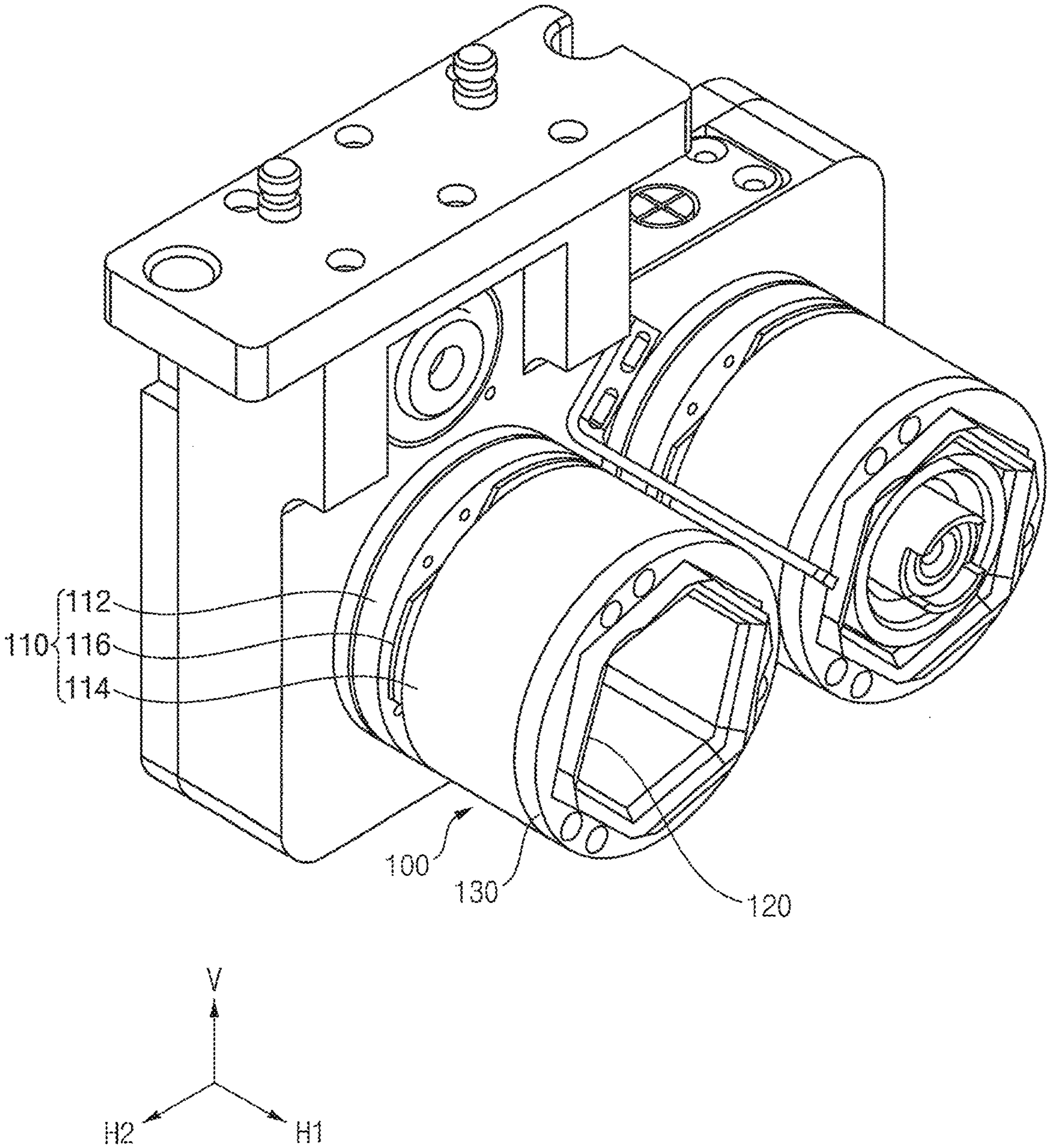
Figure 3:
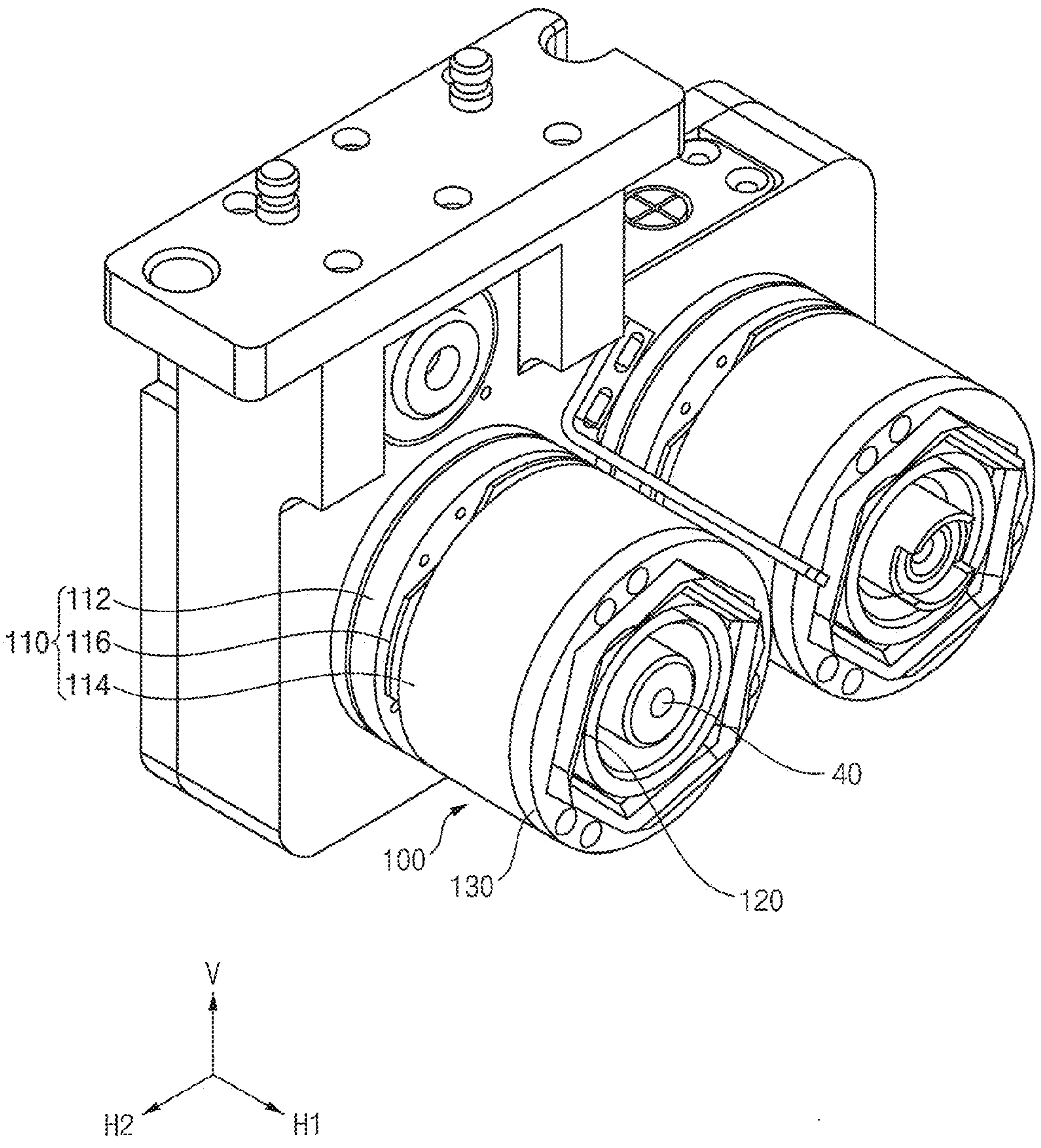

FIG. 1 is an exploded perspective view illustrating a gas cylinder with an end cap holder in accordance with example embodiments, FIG. 2 is a perspective view illustrating a gas cylinder with an end cap holder in accordance with example embodiments and FIG. 3 is a perspective view illustrating an end cap held by the end cap holder in FIG. 2.

Referring to FIGS. 1 to 3, a valve 20 may be installed at an upper end of a gas cylinder 10. A nozzle 30 may be horizontally installed at the valve 20. An end cap 40 may be installed at the nozzle 30. An end cap holder 100 may be configured to selectively hold the end cap 40.

In example embodiments, an axial direction of the valve 20 may be a vertical direction V. An axial direction of the end cap 40 substantially perpendicular to the valve 20 may be a first horizontal direction HE A second horizontal direction H2 may be substantially perpendicular to the first horizontal direction HE Further, a first surface may be oriented toward the end cap 40. A second surface may be opposite to the first surface.

When the gas cylinder 10 may be exchanged with new one, the end cap 40 may be separated from the nozzle 30 using the end cap holder 100 of an exchanger. A gas line may be connected to the nozzle 30 to supply a gas to the gas cylinder 10. After supplying the gas, the end cap 40 may be combined with the nozzle 30 using the end cap holder 100. The end cap holder 100 may be configured to transmit a torque of the exchanger to the end cap 40.

During combining and separating the end cap 40, the valve 20 may be tilted to the vertical direction V and/or the second horizontal direction H2. Thus, the end cap 40 may also be tilted to the vertical direction V and/or the second horizontal direction H2. A conventional end cap holder may not accurately hold the tilted end cap 40. However, the end cap holder 100 of example embodiments may have a function for correcting a tilted angle of the end cap 40 to accurately hold the tilted end cap 40.

Figure 4:
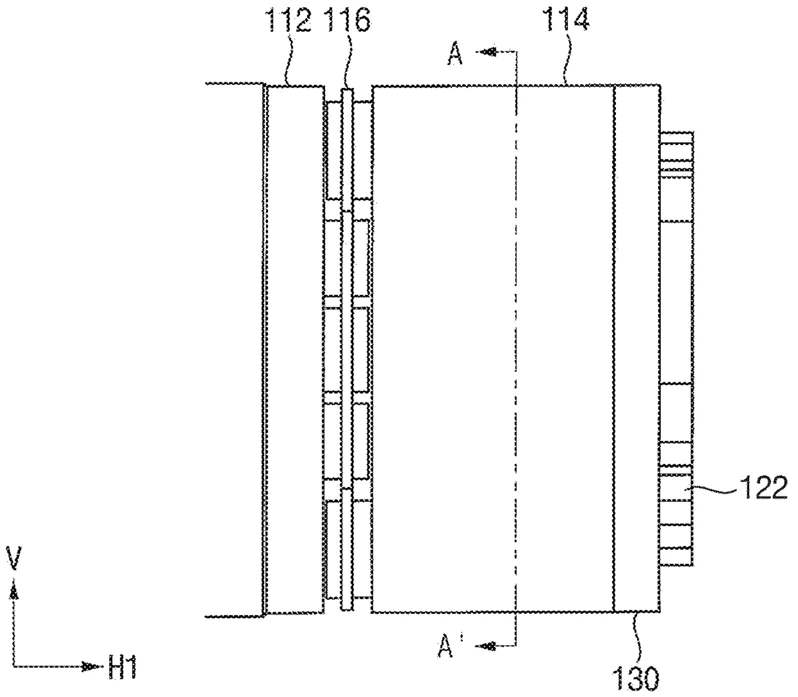
Figure 5:
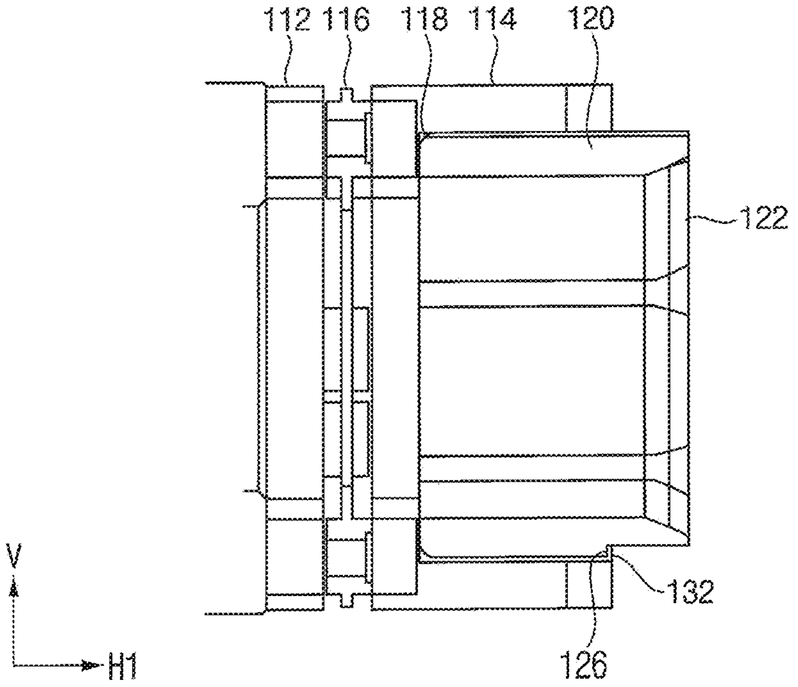
Figure 6:
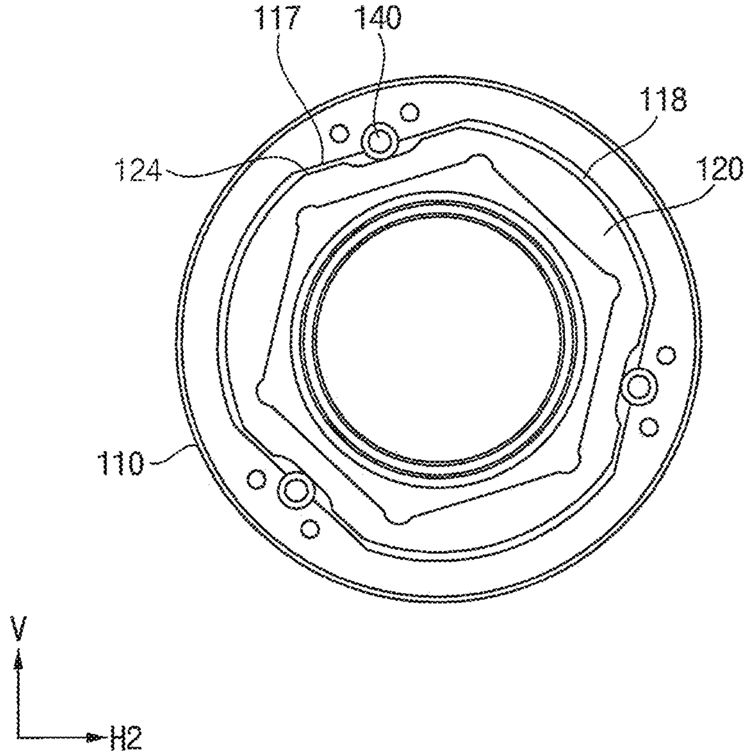
Figure 7:
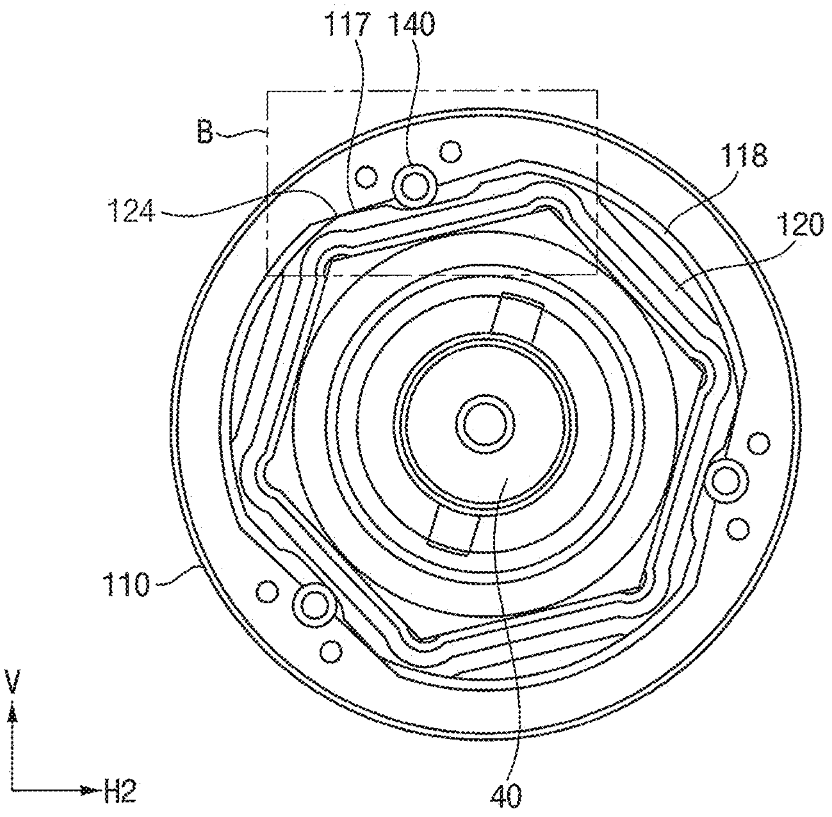
Figure 8:
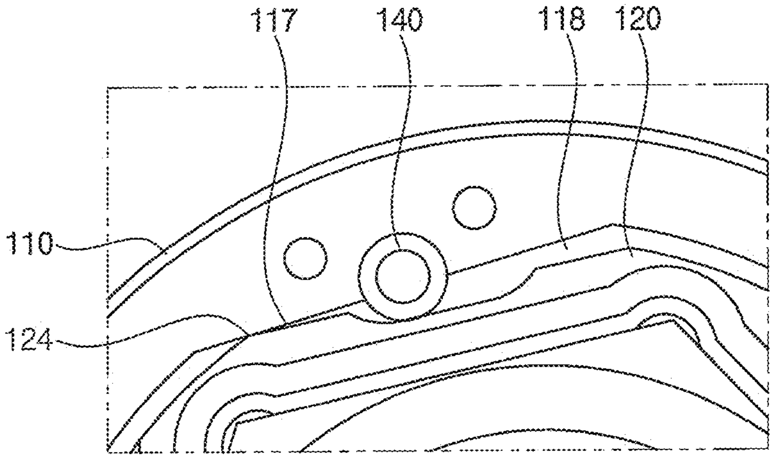

FIG. 4 is a side view illustrating the end cap holder in FIG. 2, FIG. 5 is a cross-sectional view illustrating the end cap holder in FIG. 4, FIG. 6 is a cross-sectional view taken along a line A-A' in FIG. 4, FIG. 7 is a cross-sectional view illustrating an end cap held by the end cap holder in FIG. 6 and FIG. 8 is an enlarged cross-sectional view of a portion "B" in FIG. 7.

Referring to FIGS. 4 to 8, the end cap holder 100 may include a base block 110, a holding block 120 and/or a stopping block 130.

The base block 110 may have a cylindrical shape. Thus, the base block 110 may have an axial direction corresponding to the first horizontal direction H1. The base block 110 may be configured to provide the end cap 40 with the torque of the exchanger.

The base block 110 may include an angle correction groove 118. The angle correction groove 118 may be formed at a first surface of the base block 110 oriented toward the end cap 40. In example embodiments, the angle correction groove 118 may have a cylindrical shape, not limited thereto.

In example embodiments, the base block 110 may include a first block 112, a second block 114 and/or a disc coupling 116. The angle correction groove 118 may be formed at the second block 114. The disc coupling 116 may be positioned between the first block 112 and the second block 114 to connect the first block 112 and the second block 114 with each other for allowing a relative movement. The disc coupling 116 may include a plurality of discs overlapped with each other. The disc coupling 116 may have a function for correcting a misalignment between the end cap 40 and the end cap holder 100 and for transmitting the torque. Alternatively, the base block 110 may include a single block.

The holding block 120 may be configured to hold the end cap 40. When the end cap 40 may have a hexagonal bolt shape, the holding block 120 may include a hexagonal holding nut 122 configured to hold the end cap 40. The holding nut 122 may be formed at a first surface of the holding block 120 oriented toward the end cap 40.

The holding block 120 may be partially received in the angle correction groove 118 of the base block 110. That is, a second surface of the holding block 120 may enter into the angle correction groove 118. In contrast, the first surface of the holding block 120 may protrude from the angle correction groove 118 toward the end cap 40 in the first horizontal direction H1. Thus, the holding nut 122 on the first surface of the holding block 120 may also protrude from the angle correction groove 118 toward the end cap 40 in the first horizontal direction H1. Therefore, the holding block 120 may have a diameter slightly smaller than a diameter of the angle correction groove 118.

In example embodiments, the holding block 120 may be rotatably receivable in the angle correction groove 118. For example, the holding block 120 may be rotatably receivable in the angle correction groove 118 centering around the first horizontal direction H1. Further, the holding block 120 may be rotatably receivable in the angle correction groove 118 centering around the vertical direction V and/or the second horizontal direction H2. That is, an outer circumferential surface of the holding block 120 may not make contact with an inner circumferential surface of the angle correction groove 118 so that the holding block 120 may be slightly tilted in the angle correction groove 118 centering around the vertical direction V and/or the second horizontal direction H2. By tilting the holding block 120 in the angle correction groove 118 centering around the vertical direction V and/or the second horizontal direction H2, the holding block 120 may approach the end cap 40 to accurately align the holding block 120 with the end cap 40 tilted to the vertical direction V and/or the second horizontal direction H2. As a result, the holding nut 122 of the holding block 120 may be inserted into the tilted end cap 40 so that the holding block 120 may accurately hold the end cap 40.

Further, the holding block 120 may be movably received in the angle correction groove 118 with respect to a center of the angle correction groove 118. Thus, although a center of the holding block 120 may not be aligned with a center of the end cap 40, during the holding block 120 may approach to the end cap 40, the center of the holding block 120 may be aligned with the center of the end cap 40 such that the holding block 120 may accurately hold the end cap 40.

In order to combine/separate the end cap 40 with/from the gas cylinder 10, the holding block 120 may have a function for transmitting the torque of the base block 110 to the end cap 40. The holding block 120 may be configured to selectively make point contact with the base block 110.

For example, a plurality of straight contact surfaces 117 may be formed at the inner circumferential surface of the base block 110. The contact surfaces 117 may be spaced apart from each other by a uniform gap. The holding block 120 may include a plurality of angular contact portions 124. Each of the contact portions 124 may correspond to both ends of a linear surface formed at the inner circumferential surface of the holding block 120. That is, when the linear surface may be partially formed on the inner circumferential surface of the holding block 120, angular portions at the both ends of the linear surface may be formed of the contact portions 124. The contact portions 124 may be spaced apart from each other by a uniform gap.

As mentioned above, because the holding block 120 may be rotatably received in the angle correction groove 118, the outer circumferential surface of the holding block 120 may not make contact with the inner circumferential surface of the base block 110. That is, because the contact portions 124 may be positioned in the angle correction groove 118, the contact portions 124 may also not make contact with the contact surfaces 117.

When the base block 110 may be rotated after holding the end cap 40 by the holding block 120, at least one of the contact portions 124 may make point contact with the contact surface 117. The contact portion 124 may have a radius longer than a radius of the contact surface 117. Thus, the holding block 120 may not be rotated centering around the first horizontal direction H1 after the contact portion 124 may make point contact with the contact surface 117. Therefore, the torque of the base block 110 may be applied to the end cap 40 through the holding block 120.

The stopping block 130 may be arranged at the first surface of the base block 110. The stopping block 130 may have an annular shape. Thus, the stopping block 130 may be rotated together with the base block 110. The stopping block 130 may have an inner diameter slightly longer than an outer diameter of the holding block 120. Thus, the holding block 120 may pass through the annular stopping block 130.

The stopping block 130 may be configured to reduce or prevent the holding block 120 in the angle correction groove 118 from being released toward the end cap 40 in the first horizontal direction H1. The stopping block 130 may include a stopper 132 formed from an inner circumferential surface of the stopping block 130 toward the center of the angle correction groove 118. The stopper 132 may block a step formed on the outer circumferential surface of the holding block 120 to reduce or prevent the release of the holding block 120 from the angle correction groove 118.

Additionally, a plurality of resilient members 140 may be arranged in the angle correction groove 118. The resilient members 140 may be configured to resiliently support the holding block toward the center of the base block 110 to locate the holding block 120 at the center of the base block 110. Each of the resilient members 140 may be fixed to the inner surface of the angle correction groove 118 to resiliently support the holding block toward the center of the base block 110. In order to apply a uniform resilient force to the holding block 120, the resilient members 140 may be spaced apart from each other by a uniform gap. In example embodiments, the resilient members 140 may include plate springs, not limited thereto. For example, the resilient members 140 may include rubber.

In example embodiments, each of the resilient members 140 may be positioned between the adjacent contact portions 117 of the holding block 120, not limited thereto. Further, each of the resilient members 140 may be arranged in a receiving groove 119 formed at the outer circumferential surface of the holding block 120.

According to example embodiments, the holding block may be rotatably received in the angle correction groove so that the holding block may accurately hold the end cap tilted to a vertical axis or a horizontal axis. Thus, a time for assembling/disassembling the end cap may be reduced.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An end cap holder for a gas cylinder, the end cap holder comprising:

a base block configured to apply a torque, which is used for combining/separating an end cap at a nozzle of the gas cylinder, to the end cap, the base block including an angle correction groove, and the angle correction groove at a first surface of the base block oriented toward the end cap; and a holding block rotatably receivable in the angle correction groove, the holding block including a holding nut configured to hold the end cap, and the holding block configured to selectively make point contact with the base block to transmit the torque of the base block to the end cap.

2. The end cap holder of claim 1, wherein the holding block is rotatably receivable in the angle correction groove centering around a second horizontal direction substantially perpendicular to a first horizontal direction corresponding to an axial direction of the end cap.

3. The end cap holder of claim 2, wherein the holding block is rotatably receivable in the angle correction groove centering around a vertical direction substantially perpendicular to the first horizontal direction.

4. The end cap holder of claim 3, wherein the holding block is movably receivable in the angle correction groove with respect to a center of the angle correction groove.

5. The end cap holder of claim 1, wherein a plurality of straight contact surfaces is formed on an inner circumferential surface of the base block, and a plurality of angular contact portions, which are configured to selectively make point contact with the contact surfaces, is formed on an outer circumferential surface of the holding block.

6. The end cap holder of claim 5, wherein each of the contact portions corresponds to both ends of a linear surface formed on the outer circumferential surface of the holding block.

7. The end cap holder of claim 1, wherein the base block comprises:

a first block;

a second block including the angle correction groove; and a disc coupling arranged between the first block and the second block to connect the first block and the second block with each other for allowing a relative movement.

8. The end cap holder of claim 1, further comprising a stopping block at the first surface of the base block configured to prevent a release of the holding block from the angle correction groove toward the end cap.

9. The end cap holder of claim 8, wherein the stopping block comprises a stopper protruding from an inner surface of the stopping block toward the holding block to prevent the release of the holding block.

10. The end cap holder of claim 1, further comprising a plurality of resilient members on an inner surface of the angle correction groove to resiliently support the holding block toward a center of the base block.

* * * * *